United States Patent [19]

Kenyon

[11] Patent Number: 4,642,441
[45] Date of Patent: Feb. 10, 1987

[54] PORTABLE FAN FOR WINTER AND SUMMER USE

[75] Inventor: Eric Kenyon, Ringwood, Australia

[73] Assignee: Allware Agencies Limited, London, England

[21] Appl. No.: 408,163

[22] Filed: Aug. 16, 1982

[30] Foreign Application Priority Data

Aug. 17, 1981 [AU] Australia ............................... PF0274

[51] Int. Cl.$^4$ ........................... F24H 3/04; F24H 9/20; F24F 13/08; F01D 7/00
[52] U.S. Cl. .................................. 219/364; 98/40.24; 219/373; 219/501; 364/557; 415/51; 416/39
[58] Field of Search ............... 219/364, 361, 368, 369, 219/370, 371, 501, 505, 494, 373, 489-491; 415/1, 10, 12, 17, 51; 416/31, 37, 36, 39; 364/557; 98/40.1-40.29

[56] References Cited

U.S. PATENT DOCUMENTS

| | | | |
|---|---|---|---|
| 1,154,587 | 9/1915 | Williams | 219/364 |
| 1,714,167 | 5/1929 | Hardin | 219/370 |
| 2,498,054 | 2/1950 | Taylor | 219/364 |
| 2,566,630 | 9/1951 | Powers | 98/39 |
| 2,627,799 | 2/1953 | Kurth et al. | 98/40.23 |
| 2,779,264 | 1/1957 | Petersime | 98/40.01 |
| 2,824,429 | 2/1953 | Zucker | 62/129 |
| 2,972,941 | 2/1961 | Bennett | 98/101 |
| 3,173,478 | 3/1965 | Maycen | 165/121 |
| 3,412,232 | 11/1968 | Sanders | 219/202 |
| 3,469,177 | 9/1969 | Lorenz | 323/19 |
| 3,481,534 | 12/1969 | Price | 219/373 |
| 3,496,338 | 2/1970 | Poitras et al. | 219/501 |
| 3,594,546 | 7/1971 | Smillie | 219/364 |
| 3,653,589 | 4/1972 | McGrath | 236/49 |
| 3,737,622 | 6/1973 | Hallgreen | 219/364 |
| 3,885,126 | 5/1975 | Sugiyama et al. | 219/365 |
| 3,909,589 | 9/1975 | Stone et al. | 98/40.07 |
| 3,948,154 | 4/1976 | Asakai et al. | 98/40.01 |
| 4,049,044 | 9/1977 | Cohen | 165/11 |
| 4,110,600 | 8/1978 | Spotts et al. | 219/364 |
| 4,120,615 | 10/1978 | Keem et al. | 417/360 |
| 4,170,729 | 10/1979 | Lane et al. | 219/364 |
| 4,234,782 | 11/1980 | Barabas et al. | 219/365 |
| 4,267,967 | 5/1981 | Beck et al. | 236/49 |
| 4,295,283 | 10/1981 | Tomaro | 219/373 |
| 4,298,946 | 11/1981 | Hartsell et al. | 364/557 |
| 4,302,663 | 11/1981 | Chesnut et al. | 219/369 |
| 4,307,775 | 12/1981 | Saunders et al. | 165/11 R |
| 4,350,472 | 9/1982 | Morimoto | 415/150 |
| 4,365,930 | 12/1982 | Ogura et al. | 98/40.24 |

FOREIGN PATENT DOCUMENTS

| | | |
|---|---|---|
| 7353962 | 2/1980 | Australia . |
| 80301497.6 | 11/1980 | European Pat. Off. . |
| 189724 | 4/1957 | Fed. Rep. of Germany ...... 219/364 |
| 2132419 | 1/1973 | Fed. Rep. of Germany . |
| 2334156 | 1/1975 | Fed. Rep. of Germany . |
| 2413329 | 10/1975 | Fed. Rep. of Germany . |
| 2515196 | 10/1976 | Fed. Rep. of Germany ...... 219/366 |
| 2530824 | 1/1977 | Fed. Rep. of Germany ...... 219/364 |
| 2800024 | 7/1978 | Fed. Rep. of Germany . |
| 2838939 | 5/1979 | Fed. Rep. of Germany . |
| 2852761 | 10/1979 | Fed. Rep. of Germany . |
| 2922161 | 12/1979 | Fed. Rep. of Germany ...... 219/364 |
| 2099983 | 3/1972 | France . |
| 2247680 | 5/1975 | France . |
| 142468 | 6/1980 | German Democratic Rep. ...... 98/40.19 |
| 55-23840 | 2/1980 | Japan ...... 219/364 |
| 73044463 | 3/1973 | Sweden . |
| 73011470 | 9/1974 | Sweden . |
| 1251880 | 11/1971 | United Kingdom . |
| 1563382 | 3/1980 | United Kingdom . |

OTHER PUBLICATIONS

"Electrical Indication of Airflow Rate" by Charles Murrish, NASA Tech. Briefs, Spring 1979, vol. 4, No. 1.

Variable-speed fan drives can reduce energy usage up to 60%, Design Engineering, vol. 51, No. 2, p. 12, Feb. 1980.

Primary Examiner—A. D. Pellinen
Assistant Examiner—Geoffrey S. Evans
Attorney, Agent, or Firm—Fitch, Even, Tabin & Flannery

[57] ABSTRACT

A multi-purpose fan including an electrically driven fan blade assembly, a heating coil positioned in the front of the blade assembly and rotatable air directing means which in use causes a gyratory exeunt air current. The fan also includes a micro-processor operatively associated with temperature sensors and control means to effect automated use of the fan in either a cooling or a heating mode.

14 Claims, 12 Drawing Figures

Microfiche Appendix Included
(1 Microfiche, 40 Pages)

Fig. 4.

GRAPH A

GRAPH B

GRAPH C.

GRAPH D

PORTABLE FAN FOR WINTER AND SUMMER USE

This application includes a microfiche appendix consisting of one fiche having a total of 40 frames.

BACKGROUND OF THE INVENTION

1. Field of the Invention

This invention relates to electric fan assemblies and in particular, to combined heating and cooling domestic fan assemblies.

2. Description of Prior Art

Domestic electric cooling fans traditionally fall into three distinct types:

(a) slowly rotating ceiling sweep fans, having large blades, (b) oscillating fans comprising small high speed fan blade assemblies mounted in a pivoting head assembly, and (c) box fans incorporating a high speed fan blade assembly and a rotating louvre to provide a gyratory air current.

Fans of the kind described above are effective in moving large volumes of air either by use of large diameter slowly moving fan blades or by the use of faster, small diameter fan blades.

Whilst fans of the above kind adequately cater for the requirement as cooling fans, such fans are not suitable for use as heating fans. Conventional heating fans or convection heaters incorporate electrical heating coils positioned adjacent either a centrifugal, axial, or tangential flow fan blade assembly. It is, however, important that the velocity of the exuent air is not too large because even though a fan operating at high speed will transmit as much heat to the surroundings as a slow running fan the velocity of air tends to produce a rather cool and draughty effect and for this reason, conventional heating fans operate at low flow rates to ensure that the air leaving the fan is noticeably hot.

Another problem with heating fans is caused by the tendency of hot air to rise. As an electric fan is used in a closed room, the heat rises to collect at the ceiling and after a period of time, a stratification of the atmosphere in the room takes place forming layers of different temperatures, the highest temperature being at the ceiling, with a gradual decrease in temperature to the floor. The result of this stratification is that the upper parts of the room may be unnecessarily hot whilst the lower part of the room, particularly at feet level, is many degrees cooler. This results in a waste of energy because the occupants of the room, particularly if seated, do not feel the effect of the majority of the heat produced by the fan, and moreover there is frequently a substantial degree of heat loss through the ceiling.

SUMMARY OF THE INVENTION

The present invention is concerned with an electric fan which can adequately operate both as a cooling fan and a heating fan whilst overcoming many of the disadvantages discussed above.

According to one aspect of the present invention there is provided a multi-purpose fan comprising the following components:

an electrically driven fan blade assembly, at least one heating coil positioned in the air current of said fan blade assembly, means to sense the temperature of air entering the fan, means to vary the speed of the fan blade assembly, means to vary the power output of the heating coil, and a micro-processor circuit operatively associated with said components and programmed to cause the fan to operate, when used as a heater, in the following manner:

(a) at start-up, the fan operates to produce constant temperature output at maximum heating power output with the power output of the heating coil and fan blade speed decreasing proportionately as the incoming air temperature increases, and (b) when the fan blade assembly reaches a desired minimum speed, the fan blade is held constant at said speed and the heat power output is varied proportionately with the temperature difference between a pre-selected temperature and the temperature of the incoming air.

According to a further aspect of the present invention there is provided a multi-purpose fan comprising an electrically driven fan blade assembly with at least one heating coil positioned within the air current of said fan blade assembly, means to control the speed of the fan blade assembly, means to control the power output of the heating coil, whereby in use the rate of air transfer is adjustable between 300 and 1,500 cu. ft./min. and the fan can be used both as a cooling fan and a convection heater.

According to a still further aspect of the present invention there is provided a multi-purpose fan comprising the following components:

an electrically driven fan blade assembly, at least one heating coil positioned within the air current of said fan blade assembly, means to sense the temperature of air entering the fan, and a micro-processor circuit operatively associated with said components whereby said micro-processor circuit is programmed to control and vary the speed of the fan blade assembly, heat output of the heating coil, and intermittently to cause said blade assembly to rotate at high speed for a brief period.

Preferably said micro-processor circuit includes a digital display having means to indicate any one or more of the following parameters:

(a) real time, (b) pre-programmed on/off times, (c) room temperature, (d) pre-selected temperature, and (e) fan speed setting.

According to a yet further aspect of the present invention there is provided a multi-purpose fan comprising an electrically driven fan blade assembly with at least one heating coil positioned within the air current of the fan blade assembly, rotatable air directing means positioned in front of said fan blade assembly and heating coil, means to control the speed of said fan blade assembly, means to control the power output of the heating coil, and pulse means operable to cause the fan blade assembly to operate intermittently for a brief period at high speed to substantially increase air circulation, whereby in use rotation of the air directing means causes a gyratory exuent air flow.

SUMMARY OF DRAWINGS

The present invention will now be described by way of example only with reference to the accompanying drawings in which.

DETAILED DESCRIPTION

Fan Components

Figure 1:
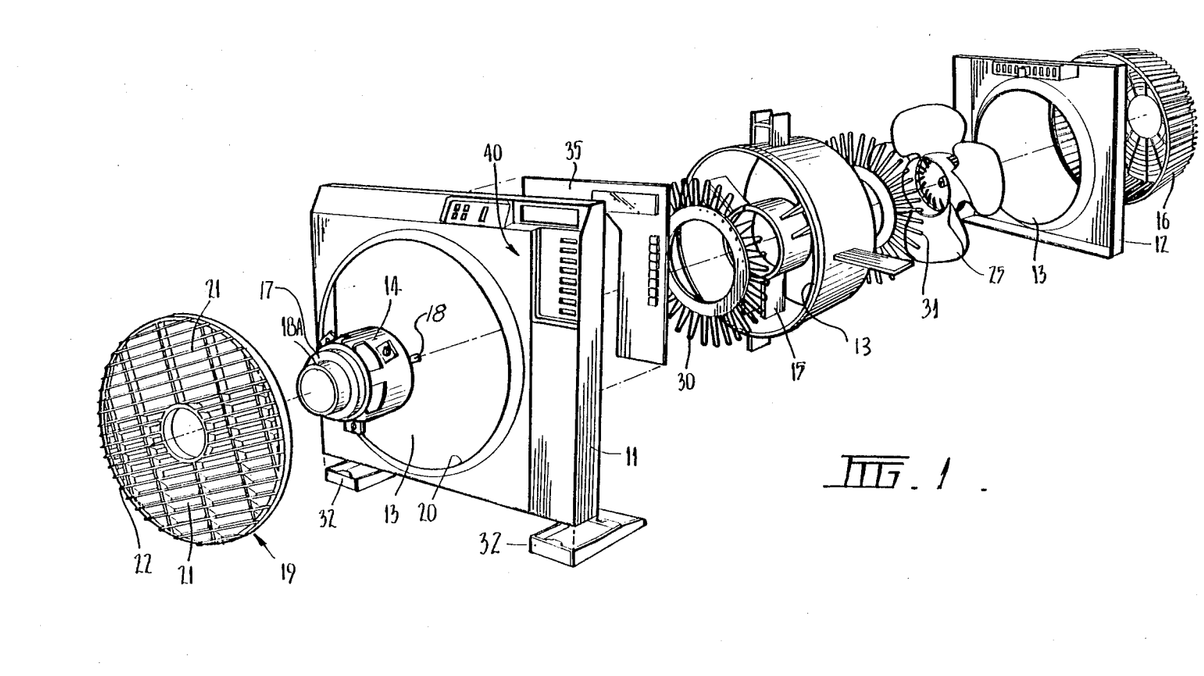
FIG. 1 is an exploded perspective view of an electric box fan.
Figure 2:
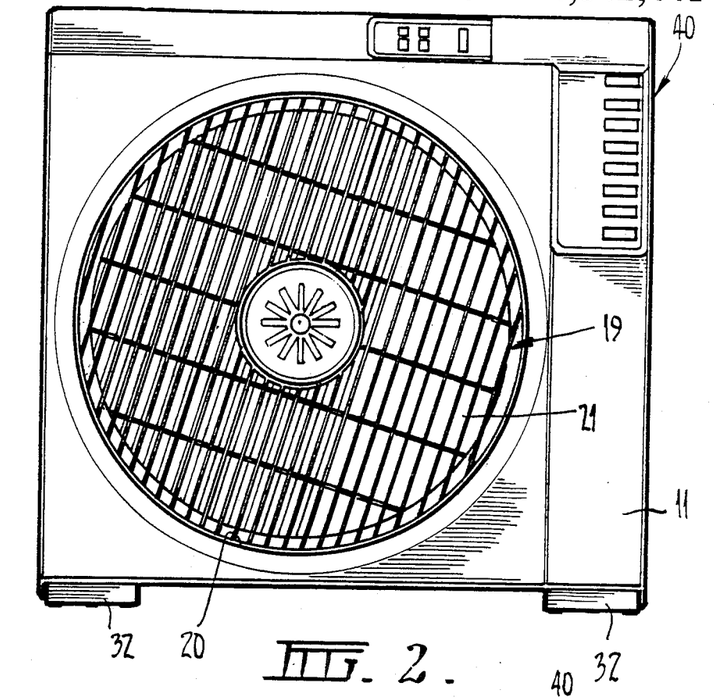
FIG. 2 is a front elevational view of the assembled fan.

An electric box fan, as illustrated in FIG. 1 comprises a housing in the form of front and rear body sections 11 and 12 moulded in plastics. The front and rear body sections are secured together to define extending therethrough a centrally positioned duct 13. The means of securing the fan body casings together may include hidden fasteners, or alternatively may incorporate interlocking and engaging clamping means of the kind disclosed in U.S. Pat. No. 4,120,615. As shown in FIG. 1 part of clamping means comprises feet which are resiliently clamped across the join between the front and rear body sections 11 & 12.

Within the central duct 13 is located an electric motor 14 supported by equally spaced apart radially extending air straightening vanes 15 that clip into one of the body sections. The electric motor 14 drives a four blade fan 25 located within a grille 16 that is secured to the rear body section 12. The electric motor is also provided with a reduction gearbox 17 having an output shaft 18 on which is attached a louvre assembly 19 via a slipping clutch mechanism 18A. The design and operation of the louvre and slipping clutch mechanisms mechanism is similar to the clutch disclosed in British Pat. No. 1,251,880 and the aforesaid U.S. Pat. No. 4,120,615.

The louvre assembly 19 is arranged to be a clearance fit within a central aperture 20 provided within the front body section 11. The louvre assembly comprises a peripheral rim 22 between which several of a plurality of parallel louvres 21 are connected, the inclination of the louvres to the central axis of the fan being altered to define the prescribed output air profile. The reduction gearbox steps down the motor speed by 180 to 1. The electric motor is a four pole shaded pole alternating current motor operable on conventional voltages.

The louvre assembly 19 may alternatively be driven by a separate electric motor thereby avoiding the use of a reduction gearbox and slipping clutch mechanism.

The operation of the fan is such that air is drawn through the rear grille 16 by the fan blades, straightened by the air-straightening vanes 15 and then expelled in a gyratory fashion by the rotating louvres 21. The effect of the rotation of the louvres is that the air is expelled in the form of a cylinder which completes a large circular path at the front of the fan. The gyratory air flow is arranged to produce air movement similar to an oscillating fan but has further improved characteristics such as increased axial and radial penetration.

Attached to either side of the radially extending air straightening vanes 15 are a pair of heating coils 30 and 31 which extends substantially across the duct 13 defined within the fan housing.

As shown in FIG. 1 and in more detail in FIG. 3 a bank of controls 40 is provided on the front body section 11 the operation of which will be described in more detail later in the specification.

The electrical circuitry of the fan is positioned on a solid state printed circuit board 35 that carries the majority of the electrical and electronic circuitry forming part of the fan. The circuit board 35 fits closely behind the top right hand corner of the front panel 11 to present a number of "touch" controls and illuminated indicators which are described in more detail hereunder. The "touch" controls include switches that open and close on mere touch contact.

Figure 5:
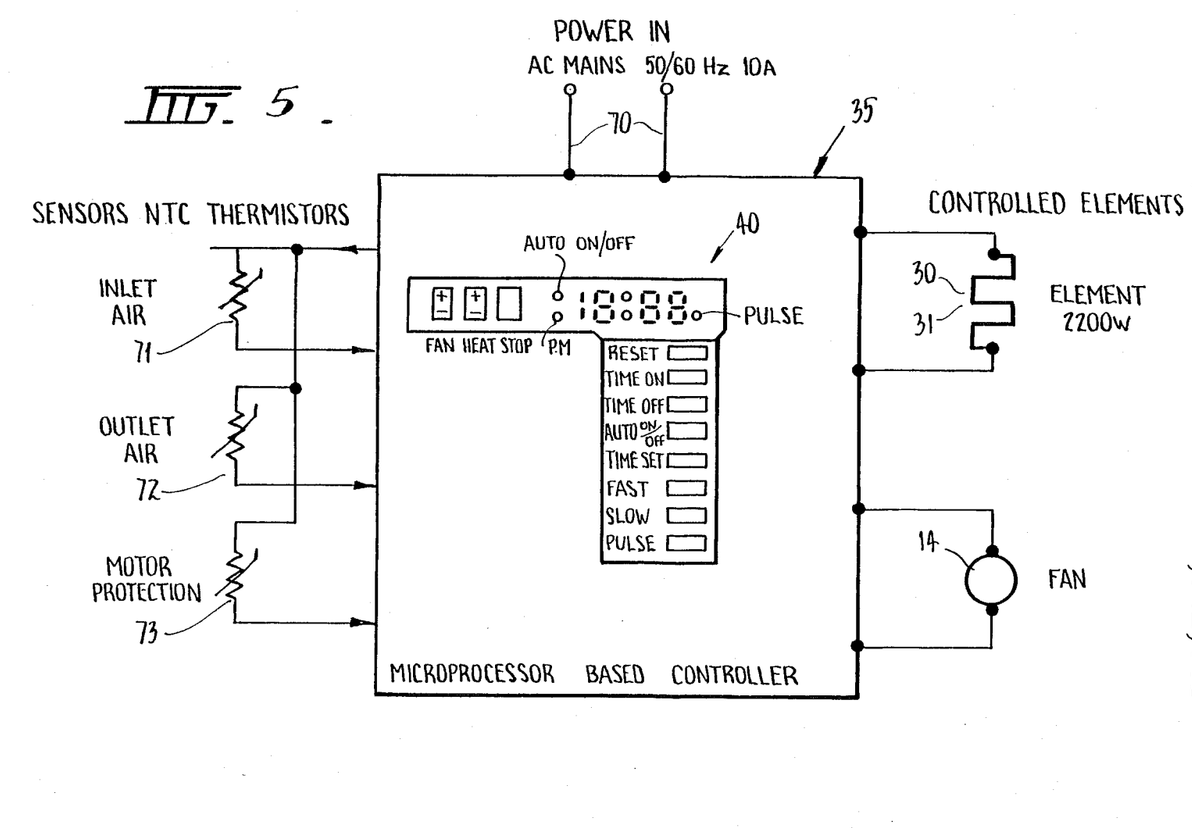
FIG. 5 is a schematic electrical circuit diagram of the fan.
Figure 6A:
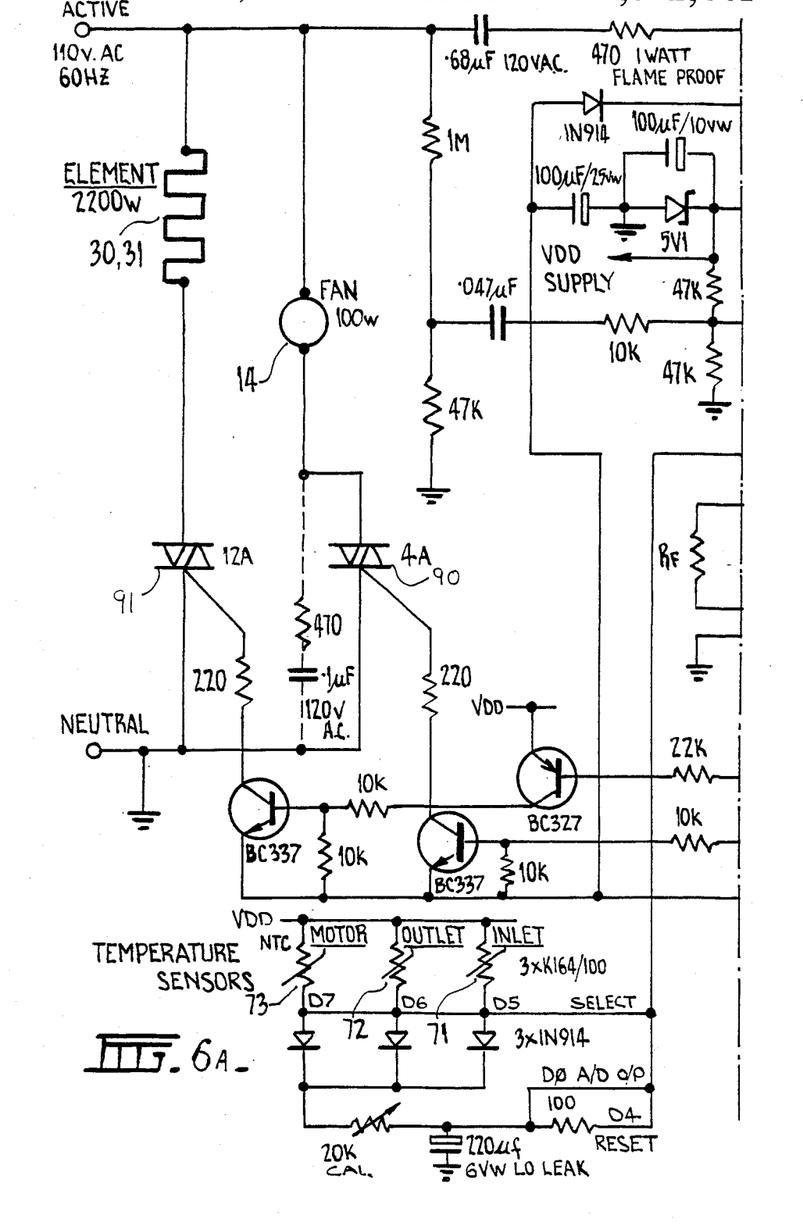
FIGS. 6A and 6B are schematic electronic circuit diagrams of the fan.
Figure 6B:
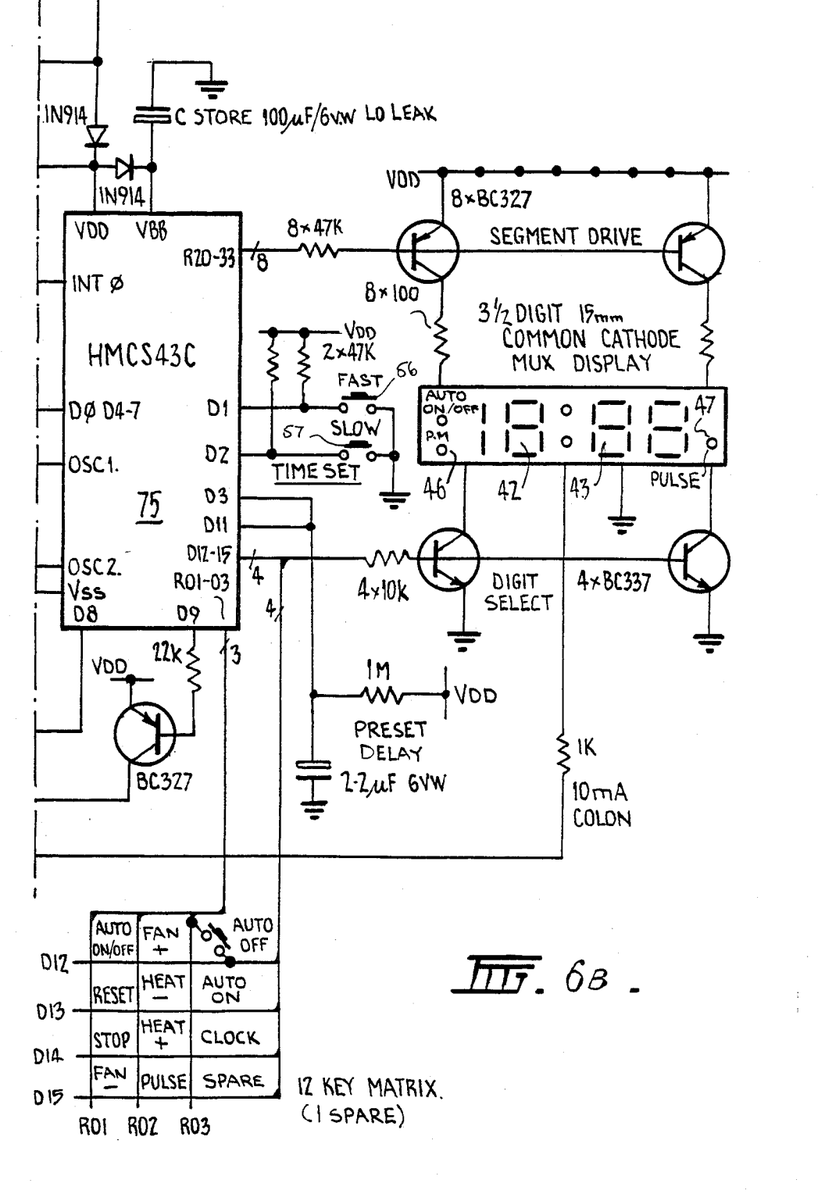

The electrical circuitry of the fan is illustrated in FIGS. 5 and 6 and incorporates solid state electronic circuitry with microchip memory features to effect the various facilities and operational responsibilities of the fan.

Figure 3:
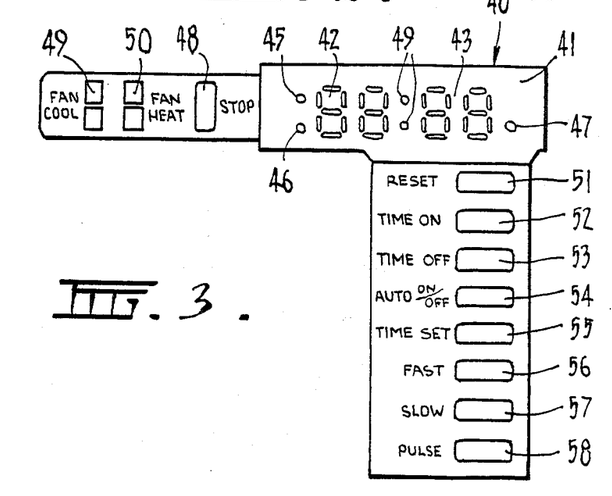
FIG. 3 is a front elevational view of a control panel of the fan.

As shown in FIG. 3 the bank of controls 40 comprises a L.E.D. (Light Emitting Diode) digital display 41 having two sets 42 and 43 of two digits separated by two flashing dots 44. The digital display incorporates a L.E.D. that causes the unit to operate as a clock that produces a time display and can be programmed to act as a time switch controlling the operation of the fan.

The display 41 also includes three Light Emitting Diodes (L.E.D.'s) 45, 46 and 47. L.E.D.'s 45 and 47 illuminate to indicate operation modes which will be described hereunder and L.E.D. 46 illuminates to indicate when the clock is in the p.m. mode.

To the left of the digital display 41 is provided a stop switch 48 which in the "OFF" mode stops all cooling fan/heater operations.

A pair of advance and retard incremental controls 49 and 50 are positioned to the left of the stop switch 48 and operate to respectively control the fan speed and heater temperature. Below the digital display 41 are provided the following column of switches:

Switch 51—RESET which resets time settings,
Switch 52—TIME ON which allows the cooling fan/heater to be switched on every 24 hours,
Switch 53—TIME OFF which allows the cooling fan/heater to be switched off every 24 hours,
Switch 54—AUTO ON/OFF allows selection of either manual or automatic operational mode,
Switch 55—TIME SET facilitates setting of real time clock,
Switches 56 and 57—FAST and SLOW facilitates adjustments of digital display for real and preset time clock, and
Switch 58—PULSE selects pulse feature which is described later.

The fan also incorporates three N.T.C. thermistors that are, as shown in FIGS. 5 and 6 coupled to the micro-processor. An inlet air temperature thermistor 71 is positioned adjacent the rear of the fan to monitor the incoming air temperature, an outlet air temperature thermistor 72 is positioned adjacent the front of the fan to monitor the outlet air temperature and a motor protection thermistor 73 is attached to the motor to ensure against overheating of the motor.

Fan Operation

The fan is arranged to operate with three variables:
(a) the speed of the fan blade,
(b) the output of the heating coils, and
(c) the time that the fan components operate.

The fan speed is variable between 500 rpm and 1,250 rpm through seven incremental steps. A solid state speed controller is used to control the speed of the shaded pole electric motor. By chopping the wave form of the A.C. input the speed of the motor can be closely controlled without wasting power by way of shunting resistors. To select the fan speed the switch 49 is activated by, touching the upper part to increase speed and, the lower part to decrease speed. The chosen speed is illustrated by any one of the numerals 1 to 7 as the left digit 42 of the display 41. On release of the switch 49 the selected speed is displayed for 5 seconds until the display reverts to real time. The heat output is similarly controlled by the switch 50 so that the desired room temperature can be selected at degree intervals between 17 degrees Celsius and 25 degrees Celsius. The selected temperature is displayed on the right hand digits 43 and the ambient room temperature is displayed on the left hand digits 42. The input air temperature is measured by the thermistor 71. The temperatures are also displayed for 5 seconds after release of the switch 50. The heat output of the heating coils is controlled by wave modulation or zero cross-over switching on the A.C. wave of the current to the coils.

The real time can be set by use of the switches 55, 56 and 57. By use of the switches 52 and 53 with the FAST or SLOW switches 56 and 57 the TIME ON and TIME OFF for heating or cooling may be selected. The AUTO switch 54 should also be switched to the ON position causing illumination of the L.E.D. 45. The RESET switch 51 can be used to reset programmed ON/OFF times. The ON/OFF time of the fan when used in either a cooling or heating mode may be selected to switch on and/or off once every 24 hours.

Figure 4:
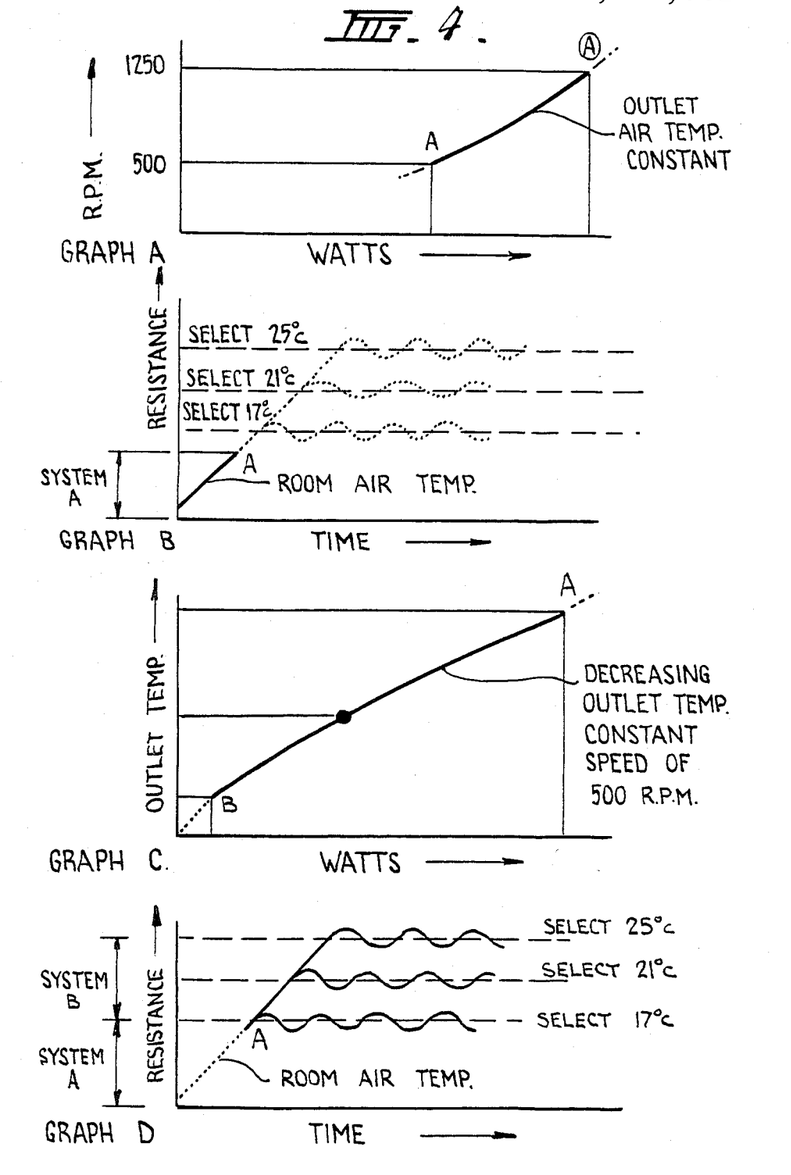
FIG. 4 consists of graphs illustrating the operation of the control systems of the fan when used in a heating mode.

To operate the fan as a convection heater two thermo-control systems (A.&B.) are incorporated through the memory of the micro-processor of the electronic circuitry. The control systems are illustrated in graphs A to D of FIG. 4:

Graph A is a plot of fan speed against heat output with the outlet air temperature held constant, Graph B is a plot of thermistor resistance against time on start-up under thermo-control System A, Graph C is a plot of fan outlet temperature against wattage output of heating coils with the fan speed held constant at 500 rpm, Graph D is a plot of thermistor resistance against time when the fan operates on thermo-control system B.

When the fan is first switched on in a cool room it is important that the fan produces the maximum heat output at least initially to take the chill off the air temperature. In this mode the fan operates under thermo-control System A. The micro-processor therefore instructs the fan to operate to produce a constant outlet air temperature of 41 degrees Celsius or 107 degrees Fahrenheit. The design of the fan is such that the correlation between the kilowatt output of the heating coils and the speed of the fan is known to produce a constant outlet air temperature. As shown on the graph (A) of FIG. 4 the fan operates initially with a maximum power output of the heating coils at high fan speed to produce the fastest possible transfer of hot air from the fan to the room. The outlet air temperature is maintained constant so that, as the room temperature increases the speed of the fan decreases proportionately with the power output of the heating coils, i.e. along the curve A—A illustrated in graph A. As the temperature of the incoming air increases the micro-processor computes the power and blade speed that is required to produce the constant output temperature of 41 degrees Celsius. The processor then alters the blade speed and heat output accordingly.

Eventually the fan slows down to the slowest practical speed for the electric motor to drive the fan blades, namely, 500 rpm. At this stage the fan switches to the thermo-control system stage B illustrated in graph C of FIG. 5. The fan blade speed is kept constant at 500 rpm but the outlet air temperature is changed by varying the power output of the heating elements. The switch-over to stage B starts on the point A on graph C of FIG. 4 and as the room temperature increases the power is reduced down the curve A-B with the fan continuing to operate at constant minimum speed.

Graphs B and D of FIG. 4 illustrate the resistance of the thermistor measured against time. The resistance to the thermistor is directly proportional to the temperature of the air entering the rear of the fan. In the control system at start-up (system A) illustrated in graph B it can be seen that as the time elapses the resistance and therefore temperature increases to the point A where the fan switches to the control system B illustrated in graph D. The thermo-control settings dictate the maximum desired temperature of the incoming air marked as "Select 17 degrees, 21 degrees or 25 degrees" on graph D. The select temperatures are three of the possible nine temperatures that can be selected by use of the FAN HEAT switch 50. Depending on which threshold has been selected the fan will operate on the control system B with the resistance of the thermistor increasing progressively with time until the threshold has been reached. At this stage the fan will have reached the point B on the graph C, that is the base of the curve. There will be a small increase in the power output each time the threshold is reached to cause a fluctuating curve along the threshold line as illustrated in figure D. Accordingly, it can be seen how the thermistor ensures that the fan operates to maintain the room at an even temperature where the heat lost to the surroundings is balanced by the heat output of the fan.

Should the air temperature of the room suddenly drop, such as by the opening of a window or door, the thermistor 71 will immediately sense the drop in temperature of the air entering the rear of the fan, transmit this information to the micro-processor to cause an increase in the outlet air temperature by an increase of the power up the curve B-A of graph C. If the quantity of cold air in the room is such that the fan has to travel right up to the point A of graph C the fan will automatically switch to the thermo-control system A (graph A) to increase the fan speed to provide an activated boost to the heat transfer. Once the temperature in the room reaches the desired level, the fan operates to produce heat so that the heat output of the fan balances the heat loss to the surroundings and the room temperature is maintained at the selected temperature.

A further feature of the fan is its capacity to break up the stratification of the air within a room. As described above, the fan will heat a room to a particular temperature but hot air tends to rise to the ceiling causing a stratification of air within the room with the hottest air against the ceiling. After a period of time, the room develops layers of heated air increasing in temperature upwardly from the floor. Experiments have shown that in a room with a 9 ft. ceiling there can be as much as 8 degrees Celsius temperature difference between the floor and ceiling. This is an undesirable feature which only results in a waste of heating energy. The design of the fan described above produces a cylinder of exeunt hot air which transcribes a circle round the front of the fan. The moving cylinder of air tends to disturb the layers of hot air and thus reduce the stratification, a feature illustrated in the comparison of FIG. 9 and discussed later.

To additionally break up the stratified atmosphere within the room, particularly when operating at point B on graph C the fan is provided with a pulse means which every 10 minutes operates for 10 seconds and over-rides the thermistor and temperature controls. The pulse means causes the fan to increase its speed to the maximum speed of 1,250 rpm for 10 seconds thereby causing a large transfer of air through the fan to break up the stratification. This sudden transfer of air causes turbulence within the room and forces the hot air down from the ceiling to the floor to substantially reduce the temperature differential between the floor and the ceiling. Once the fan has completed its pulse operation the fan continues to operate as before.

The pulse means may be selected by activation of the PULSE switch 58 and is indicated by the L.E.D. 47. The pulse may be added to a non-programmed time sequence when the fan is operating either as a heater or a cooling fan. If the fan is to be pre-programmed to include the pulse the PULSE switch 58 should be touched within 5 seconds and immediately after the heating or cooling mode has been selected.

The fan also incorporates a number of safety features to ensure against over-heating of the fan housing. Should the electric motor cease to operate, the heating coils incorporate a conventional cut-out mechanism such as a bi-metallic strip which operates once the temperature within the fan housing reaches a pre-determined level. A further safety feature illustrated with reference to FIG. 6, is provided in case the passage of incoming air is blocked, for instance, by the fan being placed near a curtain. If the passage of incoming air is blocked, the difference between the inlet and outlet temperatures are compared and when this difference reaches a pre-determined level the micro-processor relays a signal to switch off the power to the motor and heating coils until the temperature difference drops below the threshold level. However, this circuit also incorporates a delay factor during which the motor and coils are switched off independently of the temperature. After the temperature has dropped below the threshold and the time has expired the motor and coils are switched back on. If the blockage is still present the temperature difference will again rise above the pre-determined threshold and the operation will be repeated. If this procedure happens three times the electronic circuitry immediately and finally switches off both the motor and the heating coils. The L.E.D.'s on the thermo-control panel all flash to indicate the existence of a problem. To re-start the fan the circuitry must be reset after the obstruction has been removed.

A third safety feature includes a cut-out activated by the micro-processor that switches off the motor and heating coils when the electric motor overheats.

Electric and Electronic Circuitry

FIG. 5 is a schematic electrical circuit diagram illustrating the interconnection of the various components of the fan. The printed circuit board 35 is coupled to the A.C. mains power supply 70, the heating coils 30 and 31, the electric motor 14, the air inlet thermistor 71, air outlet thermistor 72, and motor protection thermistor 73. The display, switches and L.E.D.'s are mounted on the circuit board 35.

FIG. 6 shows in more detail the precise electronic circuitry for a 110 volt 60 hertz alternating current mains supply. The micro-processor 75 is a silicon chip manufactured by Hitachi under brand No. HMCS43C. The micro-processor is programmed by a technique called masked-programming from the software listed in the microfiche appendix hereto. The display is a multiplex display that utilises L.E.D.'s for both the warning lights and digital display. The manner in which the display 40, key board switches, temperature sensors 71, 72, 73, heating coils 30, 31 and fan motor 14 are coupled to the micro-processor 75 are fully illustrated with reference to FIG. 6 that also includes the details of the transistors, diodes, capacitors and resistors that would be required to effect the desired operation of the circuit. The circuit should also include Triacs 90, 91 that respectively control the speed of the fan motor and power output of the heating element.

Performance Comparisons

To determine the capacity of the fan to heat or cool a room the air flow rate has been calculated under British Standard 590. The fan is placed 1 meter off the floor in a room. The velocity of the exeunt air is measured at spaced intervals across a line across the fan at a position three times the diameter of the fan blade measured along the axis of the fan outwardly from the front of the fan. Air velocities below 100 ft./minute are ignored and the sum total is then calculated on a circle allowing an average velocity and air flow rate to be calculated. For the fan described above the following information has been calculated based on a 10" four blade fan.

| Blade speed rpm | Average Velocity ft./min. | Air Flow Rate cu. ft./min. |
|---|---|---|
| 500 | 280 | 470 |
| 600 | 336 | 604 |
| 700 | 392 | 784 |
| 750 | 420 | 909 |
| 900 | 504 | 953 |
| 1,250 | 900 | 1,400 |

In various comparison tests the fan described above has been compared with other models of cooling or heating fans.

Figures 7, 8:
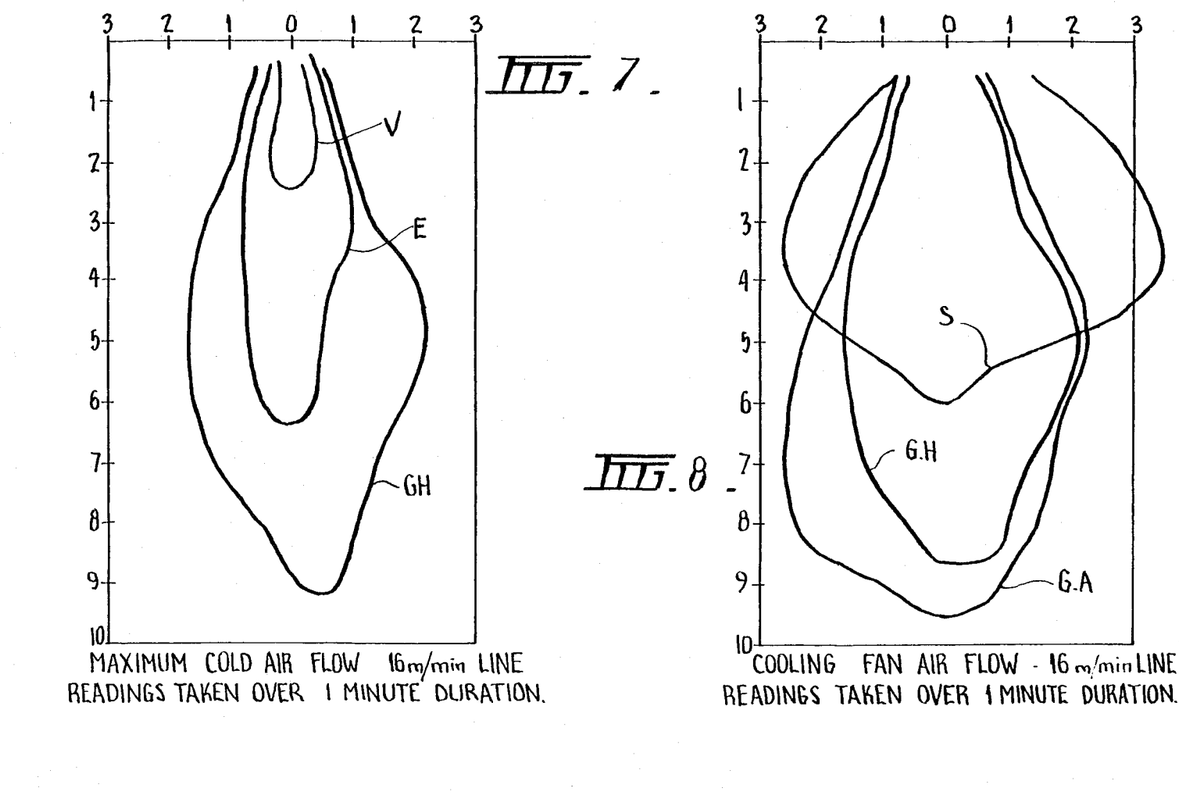
FIGS. 7 to 10 are graphs illustrating a comparison of the performance of the fan with other proprietary fans in various modes of operation.

FIG. 7 is a graph illustrating the penetration of the fan of this application, referred to as "GH" against two heating fans currently on sale in Australia and referred to as "E" and "V". The readings for the penetration were taken by use of an anometer that took readings along the velocity line of airflow exeunt from the fans at 16 meters per minute. The readings were taken over 1 minute duration and all three fans were operating at maximum output. The "GH" fan operated at 1,250 rpm on a 10 inch axial blade. The "E" fan operated with a 6 inch axial blade at 1,350 rpm and the "V" fan operated at 2,400 rpm with a 4 inch centrifugal blade. It can be seen that the maximum axial or longitudinal penetration of the "GH" fan was between 9 and 9½ meters and the maximum radial or transverse penetration was between 3 and 4 meters. It can be further seen that the "E" and "V" fans have far less penetration, both longitudinally and transversely. However, it should be noted that the "V" and "E" fans are primarily convection heaters and were not specifically designed to operate as cooling fans.

In FIG. 8 there is an illustration of a similar graph comparing the "GH" fan with two fans herein referred to as "GA" fan and "S" fan. Both the "GA" and "S" fans are specifically designed as cooling fans. The "S" fan is a fan of the oscillating type and has 12 inch axial blade running at 1,180 rpm whilst the "GA" fan incorporates a rotating louvre that operates in the same manner as the rotating louvre of the "GH" fan. The "GA" fan incorporates a 12 inch axial blade rotating at 1,250 rpm in comparison with a 10 inch blade of the "GH" fan. It can be seen from FIG. 8 that the "GH" fan compares favourably with its competitors as a cooling fan.

Figure 9:
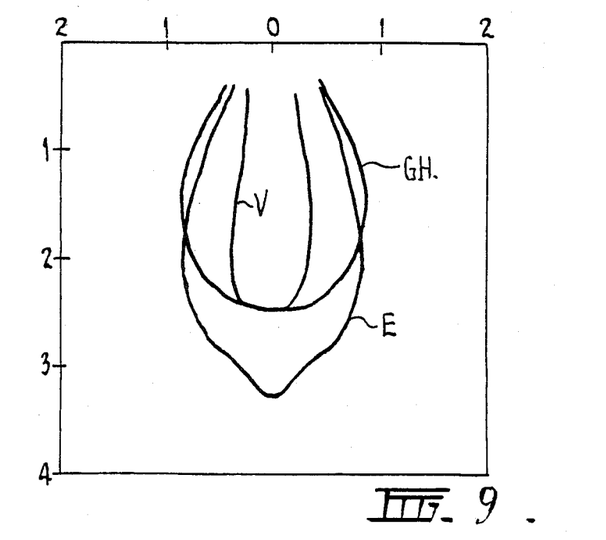
Figure 10:
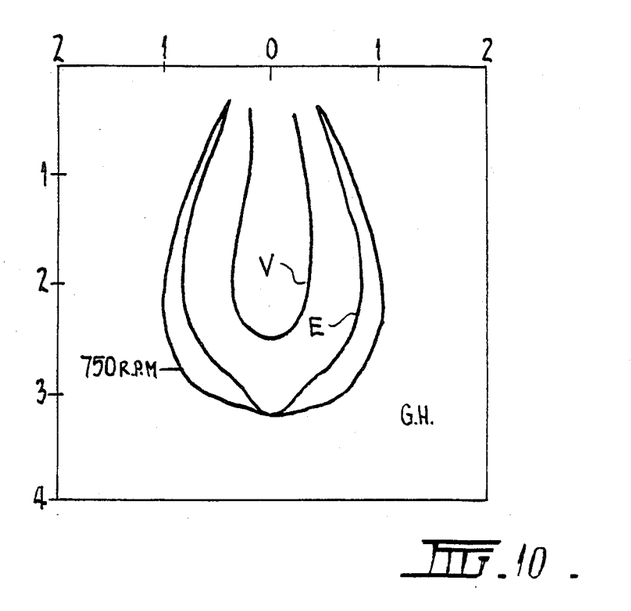

FIGS. 9 and 10 illustrate the penetration of the "GH" fan when operating as a convection heater in comparison with the "E" and "V" fans when used as convection heaters. At 750 rpm it can be seen that the penetration of the "GH" compares favourably with its competitors. At 500 rpm the penetration of the "GH" is slightly inferior to the "E" heater. However, it should be noted that the "E" and "V" convection heaters are far less effective when used in a cooling mode. The "E" and "V" heaters were also operating in both tests at maximum speed and power output.

Figure 11:
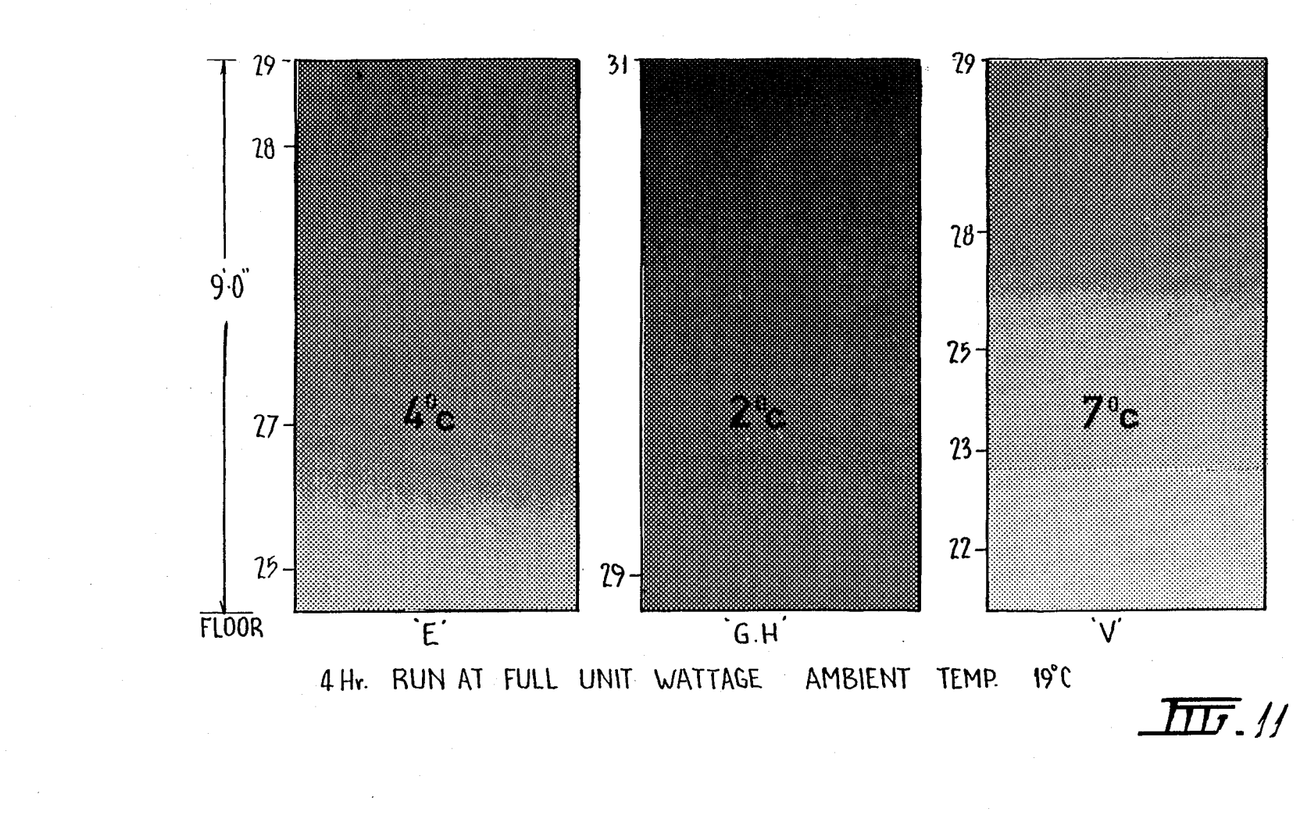
FIG. 11 is a comparative illustration of the stratification produced by different models of heating fans.

FIG. 11 illustrates a comparison of the stratification of the atmosphere within a room caused by the respective operations of the "GH", "V" and "E" fans when used as heaters. The room had a 9 feet ceiling and each fan was operated at full power output for 4 hours. The power output of each fan was substantially the same. The "GH" fan did not operate in the manner described above, that is by following the thermo-control systems A-B and by use of the pulse means. The test was carried out with the fan simply operating at 700 rpm and maximum power output of 2.4 kilowatts.

From FIG. 11 it is noticeable that at the end of a 4 hour run the "GH" fan heated the room to a maximum temperature of 31 degrees Celsius at the ceiling with a minimum temperature of 29 degrees Celsius at the floor, the "V" fan heated the room to a maximum temperature of 29 degrees Celsius at the ceiling with a bottom temperature of 22 degrees Celsius at the floor and the "E" fan heated the room to a maximum temperature of 29 degrees Celsius at the ceiling with a minimum temperature of 25 degrees Celsius at the floor. It can be seen that the "GH" convection fan produced a far more even dispersion of the heat. This is caused primarily by the high speed (750 rpm with 10 inch blade) and also the gyroscopic action produced by the rotating louvre. Furthermore, the room appears to be hotter after 4 hours of use with the "GH" fan than the other two fans, even though the power output of the fans was about the same. This additional heat and therefore efficiency can be explained because the largest source of heat loss in the room was through the ceiling and the "E" and "V" fans suffered the problem that the hot air rose rapidly to the ceiling whilst the "GH" fan, by causing an improved penetration and circulation of the hot air kept the hot air away from the source of major loss therefore in effect, reduced the heat loss to the surroundings.

It is envisaged that use of the pulse means to further break up the stratification of the atmosphere within the room will further improve results of the "GH" fan illustrated in FIG. 11.

The fan described above can accordingly be used as a conventional cooling fan incorporating variable speed and timing facilities for both delay and length of operation. The fan can be used as a convection heater which operates in a desired manner to initially, rapidly heat the room and then maintain the room temperature at a pre-selected temperature at optimum efficiency. During normal usage the speed of the fan is kept constant at about 500 rpm and the wattage of the heating coils is kept to a minimum to compensate for the heat loss from the room. The power consumption of the heating coils is only increased when there is excessive escape of heat. The delay and other timing facilities can also be used when the fan is used as convection heater to reduce unnecessary waste of power. To further improve the efficiency of the fan the high speed pulse mechanism breaks up the stratified atmosphere of the room to make most efficient use of the exeunt hot air.

The micro-processor control of the fan described above coupled with the gyroscopic exeunt air flow provides the fan with the ideal characteristics to operate satisfactorily both as a cooling fan and a convection heater. As a cooling fan the fan must have the capacity for large air transfer plus good axial and radial penetration. The "GH" fan described above can transfer air at a rate of 1,400 cu. ft./min. with axial penetration of between 9 and 9.5 meters with radial penetration of between 3 and 4 meters.

When used as a heater the speed of the fan can be slowed to 500 rpm producing air transfer of 470 cu. ft./min., a desirable rate which does not cause a draughty effect. The gyroscopic air flow coupled with the high speed pulse means breaks up the stratification and improves the efficiency and comfort of the fan when used as a heater.

Having now described my invention what I claim is:
1. A multi-purpose fan comprising a portable housing containing the following components:
   an electrically driven fan blade,
   at least one heating coil positioned in the air current of said fan blade,
   a heating-cooling mode selector,
   temperature sensing means to sense the temperature of air entering the fan,
   speed control means to vary the speed of the fan blade,
   power control means to vary the power output of the heating coil,
   a micro-processor circuit including a solid state timing device, selected temperature control means, and operating time selection means, said microprocessor circuit being operatively associated with said mode selector, said temperature sensing means, said speed control means and said power control means and programmed to operate said speed control means and said power control means and cause the fan to operate either as a heater or as a cooling fan, in accordance with selected parameters, operating the fan at selected high speed in the cooling mode and in the heating mode operating the fan at a speed normally low relative to the selected high speed in the cooling mode, and
   rotatable air directing means positioned in front of the fan blade for causing a gyratory exeunt air current, said fan having an air transfer rate which is about 1500 cu. ft./min. at said high speed and less than about one-third that rate at said low speed.

2. A multi-purpose fan according to claim 1 wherein said micro-processor circuit includes a digital display having means to indicate at least one of the following parameters:
(a) real time,
(b) programmed on/off times,
(c) selected temperature, and
(d) fan speed setting.

3. A multi-purpose fan according to claim 1 wherein the rotatable air directing means is driven through a reduction gearbox by an electric motor that drives the fan blade.

4. A multi-purpose fan according to claim 3 wherein a clutch is provided to facilitate disengagement of the rotatable air directing means.

5. A multi-purpose fan according to claim 1 comprising an electrical cut-out arranged to disconnect a source of power to the heating coil when the temperature within the fan housing exceeds a pre-determined maximum, the cut-out acting independently of the microprocessor circuit.

6. A multi-purpose fan comprising a portable housing containing the following components:
an electrically driven fan blade assembly, at least one heating coil positioned in the air current of said fan blade assembly,
a heating-cooling mode selector,
temperature sensing means to sense the temperature of air entering the fan,
speed control means to vary the speed of the fan blade assembly;
power control means to vary the power output of the heating coil, and
a micro-processor circuit including a solid state timing device, selected temperature control means, and operating time selection means, said microprocessor circuit being operatively associated with said mode selector, said temperature sensing means, said speed control means and said power control means and operating said speed control means and said power control means and causing the fan to operate either as a heater or as a cooling fan, in accordance with selected parameters, operating the fan at high speed in the cooling mode and in the heating mode operating the fan at a speed normally low relative to the high speed in the cooling mode, and
the micro-processor circuit providing pulse means to cause the fan blade assembly to operate in the heating mode intermittently for brief periods at high speed relative to normal low speed in the heating mode to substantially increase the air circulation intermittently.

7. A multi-purpose fan comprising a portable housing containing the following components:
an electrically driven fan blade assembly,
at least one heating coil positioned in the air current of said fan blade assembly,
a heating-cooling mode selector,
temperature sensing means to sense the temperature of air entering the fan,
speed control means to vary the speed of the fan blade assembly,
power control means to vary the power output of the heating coil,
a micro-processor circuit including a solid state timing device, selected temperature control means, and operating time selection means, said microprocessor circuit being operatively associated with said mode selector, said temperature sensing means, said speed control means and said power control means and programmed to operate said speed control means and said power control means and cause the fan to operate either as a heater or as a cooling fan, in accordance with selected parameters, operating the fan at high speed in the cooling mode and in the heating mode operating the fan at a speed normally low relative to the high speed in the cooling mode, and
an electrical cut-out arranged to disconnect the source of power to the heating coil when the temperature within the fan exceeds a predetermined maximum, the cut-out acting independently of the micro-processor circuit,
the micro-processor circuit being programmed to cut off power to the heating coil and the electrically driven fan blade assembly when the difference between the incoming temperature and the selected temperature exceeds a predetermined level, the micro-processor circuit also being programmed to supply a visual warning that power has been cut off.

8. A multi-purpose fan having a heating mode and a cooling mode and comprising an electrically driven fan blade assembly with at least one heating coil positioned within the air current of the fan blade assembly, rotatable air directing means positioned in front of said fan blade assembly and heating coil, means to control the speed of said fan blade assembly between a relatively high speed when said fan is used for cooling and a relatively low speed when said fan is used for heating, means to control the power output of the heating coil, and pulse means operable to cause the fan blade assembly to operate in the heating mode intermittently for brief periods at high speed relative to normal low speed to substantially increase air circulation intermittently, whereby in use rotation of the air directing means causes a gyratory exeunt air flow.

9. A multi-purpose fan according to claim 8 wherein a single electric motor drives the fan blade assembly and drives the rotatable air directing means through a reduction gearbox.

10. A multi-purpose fan according to either claim 8 or claim 9 wherein means is provided to sense the temperature of the incoming air.

11. A multi-purpose fan according to claim 10 wherein a micro-processor circuit is electrically coupled to the means to sense the temperature of the incoming air, the means to control the speed of the fan blade assembly and the means to control the power output of the heating coil.

12. A multi-purpose fan according to claim 11 wherein the micro-processor circuit includes a solid state timing device.

13. A multi-purpose fan according to claim 12 wherein the micro-processor circuit is electrically coupled to a digital display including means to indicate at least one of the following parameters:
(i) real time
(ii) programmed on/off times,
(iii) selected temperature, and
(iv) fan speed setting.

14. A multi-purpose fan according to claim 8 wherein the fan includes a manually operable switching means operable to select whether the fan is used as a cooling fan or a convection heater.

* * * * *